United States Patent [19]
Ho et al.

[11] Patent Number: 5,559,630
[45] Date of Patent: Sep. 24, 1996

[54] POLARIZED LIGHT MICROSCOPY

[75] Inventors: Mae-Wan Ho, London; Michael J. Lawrence, Milton Keynes, both of England

[73] Assignee: The Open University, Bucks, England

[21] Appl. No.: 390,513

[22] Filed: Feb. 17, 1995

Related U.S. Application Data

[63] Continuation-in-part of Ser. No. 118,323, Sep. 9, 1993, abandoned.

[30] Foreign Application Priority Data

Sep. 10, 1992 [GB] United Kingdom ............... 9219180
Nov. 20, 1992 [GB] United Kingdom ............... 9224365

[51] Int. Cl.$^6$ .................................................. G02B 21/14
[52] U.S. Cl. ..................... 359/371; 359/386; 359/494; 359/499
[58] Field of Search ........................... 359/370, 371, 359/386, 388, 494, 499, 500

[56] References Cited

U.S. PATENT DOCUMENTS

| | | | |
|---|---|---|---|
| 2,144,653 | 1/1939 | Graff | 359/390 |
| 2,460,515 | 2/1949 | Lowber | 359/371 |
| 2,880,648 | 4/1959 | Koester | 359/371 |
| 3,561,876 | 2/1971 | Hoffman | 359/371 |
| 4,634,240 | 1/1987 | Suzuki et al. | 359/386 |
| 4,795,246 | 1/1989 | Lord | 359/371 |
| 4,873,653 | 10/1989 | Grosskopf | 359/371 |
| 5,303,082 | 4/1994 | Obuchi et al. | 359/371 |

FOREIGN PATENT DOCUMENTS

| | | | |
|---|---|---|---|
| 1113314 | 8/1961 | Germany | 359/390 |
| 2240693 | 3/1973 | Germany | 359/371 |
| 2634832 | 2/1977 | Germany | 359/371 |
| 47-32031 | 9/1968 | Japan | 359/371 |
| 396325 | 8/1933 | United Kingdom | 359/390 |

*Primary Examiner*—Jon W. Henry
*Attorney, Agent, or Firm*—Young & Thompson

[57] ABSTRACT

In the establishment of interference colors in weakly birefringent materials within living organisms, in fixed tissues or in preparations of liquid crystals, a compensating birefringent plate is positioned in series with the object in the direction of the light path between a crossed polarizer and analyzer in a polarizing microscope, and is aligned with the vibrational direction of its slow wave at a small angle of horizontal rotation from the vibrational direction of the polarizer or of the analyzer. The small angle of rotation is between 2° and 15°, more especially 4° and 7.5°. The chromatic response (color intensity) is enhanced and increased color contrast is obtained for all live organisms, freshly fixed sections, and liquid crystal preparations.

17 Claims, 3 Drawing Sheets

Observer

16 ├─────────────┤ Analyzer

18 ╭──────────────── Compensator

10 ╭──⬭─── Object

19 ╭─╮─── Condenser

14 ├─────────────┤ Polarizer

22 ├─────────────┤ Field Iris

12 ╲ │ │ ╱ Light Source

POLARIZED LIGHT MICROSCOPY

CROSS-REFERENCE TO RELATED APPLICATION

This application is a continuation-in-part application of application Ser. No. 08/118,323, filed Sept. 9, 1993, now abandoned.

FIELD OF THE INVENTION

This invention relates generally to polarized light microscopy, and is more particularly concerned with methods of using the polarizing microscope to investigate living organisms. The invention is also concerned with polarizing microscopes adapted to carry out such methods.

BACKGROUND TO THE INVENTION

The investigation of the fine structure of living organisms has heretofore been limited by the optical transparency of the biological specimens. Whole mounts of transparent, unstained organisms can be examined under dark field illumination as well as ordinary bright field illumination with phase contrast or differential interference contrast. These methods can be used in conjunction with vital dyes and can also give gross dynamical information concerning muscular contractions, cell movements and shape changes which occur in the course of development of the organism. For detailed structural information, especially of embryonic development in optically opaque organisms, routine histological methods of sectioning and staining are generally used, and dynamic changes have to be inferred by making comparisons between sections prepared at successive stages in the development of the organism.

Polarized light microscopy is a technique which has traditionally been used for the investigation of crystalline structures of minerals and various "inert" biological materials, such as fibres, bone, chitin and exoskeletons, and, in a few cases, fixed sections of organisms. The technique has also been used in the study of contractions in isolated muscle fibres, before being supplanted by low-angle X-ray diffraction. In general, conventional polarized microscopy gives static ultrastructural information concerning the arrangement of atoms in the molecules, i.e. their birefringence or anisotropy, as well as the ordered arrangement of molecules in an array.

In order to appreciate the methods used in accordance with the present invention it is necessary to understand how a polarizing microscope functions. The essential parts of a polarizing microscope are shown schematically in FIG. 1. Conventionally, a sample (object) 10 is observed using a light source 12 and a single polarizer 14 or a polarizer 14 and analyzer 16 (i.e. a second polarizer) whose vibrational directions are crossed at right angles (90°). Interference colours are obtained from highly birefringent objects when white light is used as the light source 12 and with the polarizers 14, 16 crossed at right angles.

Each polarized (monochromatic) light ray, on passing through the birefringent object 10, is split into two mutually perpendicularly vibrating slow and fast rays, as shown in FIG. 2, which propagate through the object 10 at different velocities.

The retardation of the slow ray relative to that of the fast ray, hereinafter referred to as relative retardation, measured in nanometers (nm), generates a phase difference between the rays as they emerge from the object 10. In FIG. 2, the following convention is used to represent the vibrational directions of the light ray: a ray vibrating in the plane of the Figure is drawn as a line crossed by short bars at 90°, one vibrating perpendicularly to the plane of the Figure is drawn as a line with dots, one vibrating at 45° to the plane of the Figure is drawn as a line crossed by short bars at 45°, and one vibrating at 135° to the plane of the Figure is drawn as a line crossed by short bars at 135°. The state of polarization of the light ray from the light source 12 is random. After passing through the polarizer 14, the ray 23 is polarized with its vibrational direction at 45° to the vibrational directions of the birefringent object. 10. Within the birefringent object 10, the ray is split into two rays 24 and 25 vibrating perpendicularly to each other. On emerging from the object 10, a phase difference has been introduced between the slow ray 25, continuing as ray 27, and the fast ray 24, continuing as ray 26. When slow and fast rays are recombined into a single ray 28 by passage through the analyzer, they interfere either destructively (as shown in FIG. 2) or constructively, depending on the phase difference introduced by the birefringent object 10. The phase difference will also differ according to the wavelength of the light involved. Thus, when white light consisting of a full spectrum of wavelengths in the visible range—from 390 nm to 780 nm—is used, the phase difference introduced will differ in different parts of the spectrum. Different interference colors (or polarization colors) will be obtained according to the relative retardation between the slow and fast waves introduced by the birefringence of the object. Colored light is simply white light missing certain parts of its complete spectrum.

In the known crystallographic systems, in order to determine the vibrational directions of the slow and fast waves, and hence the anisotropy of the crystalline structure of the object 10, compensating birefringent crystal plates are inserted between the object and the analyzer. Such a compensator crystal plate is indicated at 18 in FIG. 1. The compensator plate is placed with its slow (and fast) vibrational directions at 45° between those of the crossed polarizers to align with those of the object 10 so that the birefringence of the object can be estimated from the color changes observed in the specimen 10 according as to whether the relative retardations are added, in the case where the vibrational directions of the fast and slow waves in the sample and the compensator are aligned with each other, subtracted, in the case where the fast and slow wave directions in the sample and the compensator are 90° out of alignment.

When the birefringence of the sample is not sufficiently great to generate interference colors by itself, i.e. when the relative retardation introduced between the fast and slow polarized light rays is less than 350 nm, interference colors are conventionally generated by the addition of a compensator plate with its vibrational directions aligned at 45° to those of the crossed polarizers. However, for weakly birefringent materials, i.e. those in which the relative retardation introduced is less than 100 nm, there has not heretofore been a method for establishing interference colors.

It has recently been established that a high degree of dynamic order exists in living organisms, in that coherent regimes, associated with non-equilibrium phase transitions, can arise in macromolecules and macroscopic arrays of molecules under certain energetic conditions. It should therefore be possible to observe such regimes of dynamic order within living organisms. It is already known, for example, that liquid crystals can assume ordered states at certain temperatures and under the influence of electric fields. Many arrays of macromolecular structures, as for example biological membranes and muscle fibres, may have properties not unlike those of liquid crystals.

SUMMARY OF THE INVENTION

It is one object of the present invention to provide methods of and apparatus for making visually apparent these dynamically coherent states in living organisms using polarized light microscopy.

It is a further object of the present invention to provide methods of and apparatus for producing interference colors in order to obtain high resolution, high contrast color images of entire, living, moving organisms by the use of polarized light microscopy. This technique may be referred to as interference color vital imaging.

It is yet a further object of the present invention to provide methods of and apparatus for establishing interference colors in weakly birefringent materials, i.e. materials causing relative retardation of less than 100 nm.

It is yet a further object of the present invention to provide a polarizing microscope, and methods of using the same, which enable the achievement of interference color vital imaging, and the establishment of interference colors in weakly birefringent materials.

It is still a further object of the present invention to provide methods of and apparatus for investigating dynamically ordered functional regimes in living organisms. The invention is based on the appreciation that, instead of setting the compensator plate with slow and fast vibrational directions horizontally rotated at 45° to the vibrational directions of the crossed polarizers, as is conventionally done, one should set the compensator plate with its slow or fast vibrational directions at an angle of horizontal rotation smaller than 15° to either of the vibrational directions of the crossed polarizers.

In accordance with the present invention there is provided a method of generating interference colors in an object which is a living organism or a weakly birefringent material using a polarizing microscope, which comprises placing a compensating wave-plate in a series with the object in the light path between crossed polarizers, and aligning one or other of the vibrational directions of the compensating wave-plate at a small angle of horizontal rotation from either of the vibrational directions of the crossed polarizers.

Preferably, the wave-plate is aligned with one of its vibrational directions at an angle of horizontal rotation of from 2° to 15°, preferably 4° to 7.5°, from that of the polarizer and/or the analyzer.

Preferably, the wave-plate is a birefringent crystal having a thickness sufficient to cause a phase difference of $2\pi$ of green light between the two perpendicularly polarized light rays in the passage of these rays through the plate.

In a preferred embodiment the method includes adjusting the vertical distance of a condenser of the microscope relative to the polarizer and the object in order differentially to illuminate the interior or the exterior tissue layers of the organism.

The said small angle is preferably between 4° and 7.5°. Changes of colours are caused both by a change in the orientation of the organism or tissues and also by small variations in the said small angle. Larger variations in the said small angle, beyond the range of 2°–15° specified above, can result in a loss of chromaticity. In particular, little or no chromaticity is obtained with the wave-plate aligned with its vibrational directions at 45° to those of the crossed polarizers as is conventionally done. However, this does not preclude the appearance of chromaticity in some birefringent or biological specimens under conventional conditions, especially those capable of introducing relative retardations greater than 100 nm. The wave-plate aligned at the said small angle, however, is critical for those weakly birefringent specimens (causing relative retardations less than 100 nm) that do not exhibit chromaticity under conventional conditions.

The degree of chromaticity—for a given alignment of the vibrational directions of the wave-plate with respect to those of the polarizer and analyzer of the microscope—changes in the course of changes in the specimen, which, in the case of living organisms, reflect alterations in the energetic state of the specimen. Colour changes in tissues are also correlated with activity.

Also in accordance with the invention there is provided apparatus for generating interference colors in living organisms and weakly birefringent materials, comprising a light source, a polarizer, a sample object, an analyzer, and a compensating wave-plate placed in series with the object in the light path between the crossed polarizers, wherein one or other of the vibrational directions of the compensating wave-plate is aligned at a small angle of horizontal rotation from either of the vibrational directions of the crossed polarizers.

As stated above, the small angle is preferably from 2° to 15°, more especially from 4° to 7.5°.

BRIEF DESCRIPTION OF THE DRAWINGS

Further details of the invention are given in the following description, to be read in conjunction with tile accompanying drawings, in which.

DESCRIPTION OF THE PREFERRED EMBODIMENT

For carrying out the method of the present invention one can use for example a suitably adapted Zeiss universal photomicroscope. The images can be recorded on VHS video tape with a color camera.

Figure 1:
FIG. 1 is a diagrammatic representation of the basic optical components of a transmitted light polarizing microscope.
Figure 2:
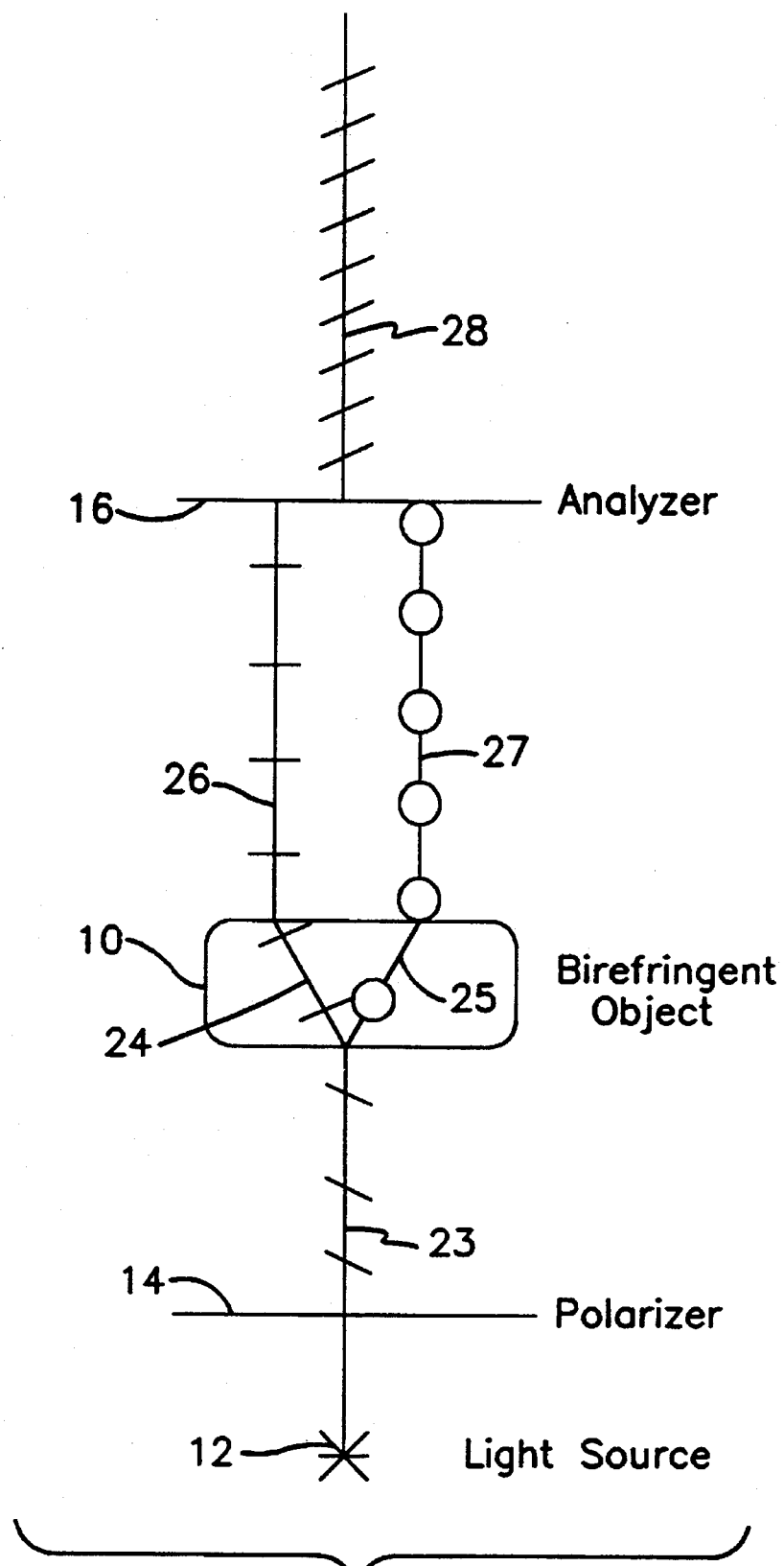
FIG. 2 is a diagrammatic illustration of the passage of plane polarized light through a birefringent (or doubly refracting) object placed between crossed polarizers and aligned with its vibrational directions at 45° to the vibrational directions of the crossed polarizers.

In a preferred embodiment of carrying out the invention a polarizing microscope having the components illustrated in FIG. 1 is set up with a living organism, including for example fresh tissue, a freshly fixed section or a liquid crystal preparation, as the object 10. The compensating wave-plate 18 is positioned between the object 10 and the analyzer 16 with the vibrational direction of its slow wave at a small angle of horizontal rotation to that of the analyzer, e.g. 2° to 15°, preferably 4° to 7.5°, depending upon the species of organism or the sample. The wave-plate 18 may be a birefringent quartz crystal whose thickness is sufficient to cause a relative retardation of 560 nm between the fast and slow components of the polarized light ray, corresponding to a phase difference of $2\pi$, or a full wavelength of green light. The system includes a field iris 22 between the light source 12 and the polarizer 14, and a condenser 19 between the polarizer 14 and the object 10.

Figure 3:
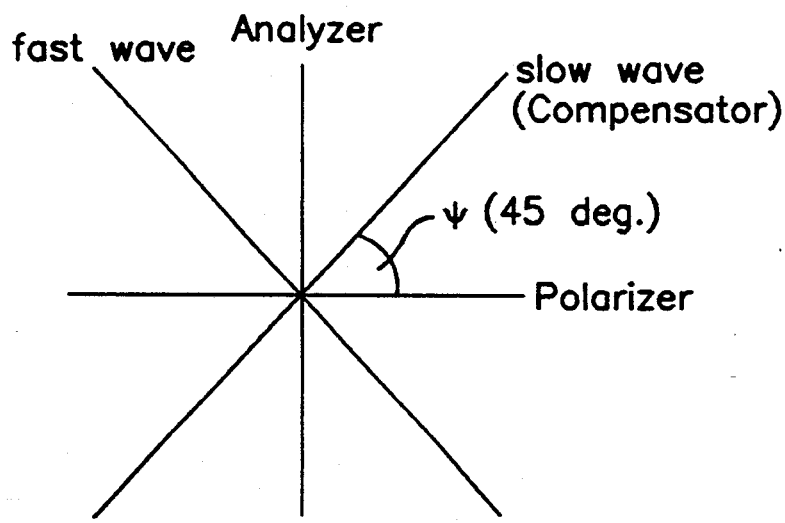
FIG. 3 is a diagrammatic representation of the conventional alignment of the vibrational directions of the compensating plate relative to those of the crossed polarizers.
Figure 4:
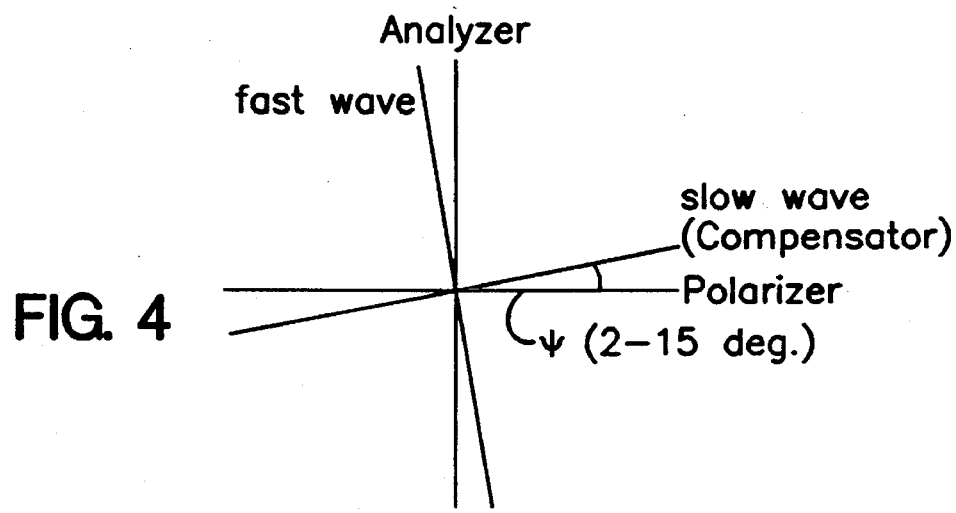
FIG. 4 is a diagrammatic representation of the alignments of the vibrational directions of the compensating plate relative to those of the crossed polarizers in a first embodiment of the present invention; and, FIG. 5 is a diagrammatic representation of the alignments of the vibrational directions of the compensating plate relative to those of the crossed polarizers in a second embodiment of the present invention.
Figure 5:
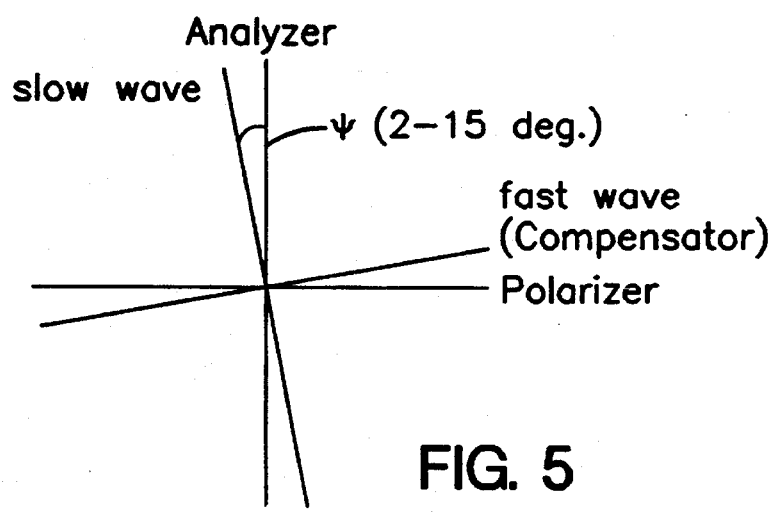

The compensator plate 18 can be positioned either above or below the object 10, but both object 10 and plate 18 must be placed between the polarizer 14 and analyzer 16 in FIG. 1. The compensator plate is further aligned with its vibrational directions at a small angle of horizontal rotation from 2° to 15°, preferably 4° to 7.5°, with respect to the vibrational directions of either of the crossed polarizers, as illustrated in FIG. 4 and FIG. 5 which give the vibrational directions of the compensator plate relative to those of the polarizer and analyzer. FIG. 4 and FIG. 5 show alternative alignments of the vibrational directions of the compensator plate relative to those of the polarizer and analyzer which are consistent with the invention; the angle $\Psi$ in either case is 2° to 15°, preferably 4° to 7.5°. FIG. 3 shows the alignment of the vibrational directions of the compensator plate relative to those of the crossed polarizers conventionally used, which is 45°.

Preferably, the compensator plate 18 is a birefringent crystal having a thickness sufficient to cause a relative retardation between the fast and slow rays of approximately 560 nm, which is equivalent to a phase difference of $2\pi$ for green light (wavelength 560 nm).

In a preferred embodiment, the method includes adjusting the vertical distance of the substage condenser 19 of the microscope between the object 10 and the polarizer 14 in order differentially to illuminate the interior or the exterior layers of the organism. Thus, when the field iris 22 is imaged on the object by the condenser 19, an average illumination, and hence resolution of exterior and interior tissue layers is obtained. Lowering the condenser from this position preferentially illuminates the exterior layers, whereas raising the condenser further will preferentially illuminate the interior layers of the organism.

Preferably, the operating technique is made quantitative, in order to exploit its full potential. This is because one can consider the intensity of light at each wavelength as that emerging from two superposed crystal plates—the one corresponding to the biological specimen or object 10 and the other, the compensator wave-plate 18 according to the following equation:

$$I = -\sin 2(\psi_2 - \psi_1)\sin 2\psi_1 \cos 2\psi_2 \sin^2 \delta_1/2 +$$
$$\sin 2(\psi_2 - \psi_1)\cos 2\psi_1 \sin 2\psi_2 \sin^2 \delta_2/2 +$$
$$\cos^2(\psi_2 - \psi_1)\sin 2\psi_1 \sin 2\psi_2 \sin^2(\delta_1 + \delta_2)/2 -$$
$$\sin^2(\psi_2 - \psi_1)\sin 2\psi_1 \sin 2\psi_2 \sin^2(\delta_1 - \delta_2)/2$$

where $\delta_1$ and $\delta_2$ are the phase differences respectively introduced by the wave-plate and the biological object, and $\Psi_1$, $\Psi_2$ are the angles that their slow (or fast) wave makes with the polarizer. Using these equations, one can work out the variation in the intensities and the color of the light emerging to the camera as a function of relative retardation caused by the object.

The colors and intensities are standardised by placing on the microscope stage a series of standard birefringent crystal plates causing known relative retardations between 0 and 100 nm, and rotating each through 180° to obtain the maxima and minima in color intensity. This procedure provides control over (i) unavoidable variations in the intensity and spectral composition of the light source, (ii) the characteristics of different microscope objectives, (iii) the position of the condenser, (iv) the aperture of the light and condenser irises, and so on. A standard matrix can be obtained by varying the angle of orientation of the standard crystal plates and assigning the color and intensity (appropriately coded) to a calculated index of birefringence. This gives a standard matrix of birefringence which allows the assignment of birefringences for different biological tissues under different physiological conditions or in different stages of development.

The photomicroscope is preferably used with computer hardware and software which can:

(i) grab and store successive frames in a real-time imaging sequence, (ii) transform the color and intensity of designated areas of an image to the appropriate index of birefringence based on the standard matrix, and (iii) compare a sequence of images and determine, e.g. plot, the changes in index of birefringence.

With the alignment the vibrational directions of the waveplate at the said small angle with respect to those of the crossed polarizers, full colors are generated in all live organisms and fresh by fixed sections of tissues, as well as liquid crystal preparations. For all specimens, the chromatic response under the conventional conditions of a wave-plate with its vibrational directions aligned at 45° with respect to those of the crossed polarizers is either nonexistent or very poor.

The colors generated in living organisms are tissue-specific, following the anatomy quite precisely and independently of the geometry of the organism. This is because to a first approximation, one can consider the organism to be non-refractive everywhere—being predominantly aqueous—except when the polarized light passes through layers of phase-ordered birefringent molecules. Given that the ordered regimes are in membranes or tissue layers, it is perhaps not surprising that the colors should be independent of body geometry.

The generation of colors works specifically for living biological tissues, but freshly fixed sections can be chromatic as the fresh tissue when the phase ordering has been preserved. Like ordinary interference colors, they change according to the orientation of the organism—its anteroposterior axis with respect to the polarizers—indicating that the main body axis is also a major vibrational axis in all organisms. Thus, the colors carry structural information concerning phase ordering of the molecules, even as they change during activity: for example, contracted muscle bands in the Drosophila larva change color, from bright blue to red in certain orientations, as the wave of contraction passes along the body.

An interesting aspect of the liquid crystalline mesophases revealed by the imaging technique of the present invention in living organisms is that they may be ordered dynamically by endogenous fields or particular energetic regimes. Chromaticity (the intensity of colors) waxes and wanes in the course of development. In Drosophila for example there are chromatic stages early in development (between 2 and 4 h), but very little color is subsequently observed until some hours before the first instar larva hatches (about 23–24 h at 25° C.). At around 17–18 h of development, the color of the segmental muscle bands changes rapidly within 10 minutes from a faint, dull blue to a bright blue as the embryo starts to move. Thus, two adjacent embryos may appear structurally indistinguishable, appearing to be at the same developmental stage, and yet only the one which has begun to move will have the intense color. Thereafter, more and more colors develop in other tissues until, at hatching, the full spectrum is present. After hatching, the colors continue to intensify as the larva becomes more active.

Consistent with the intensification of colors with activity, dead organisms can be distinguished by their lack-lustre colors, which may gradually fade away altogether. Drosophila larvae exposed to dehydration or to low temperatures also lose their colors concomittantly as they become immobile, but on being revived (by rehydration and by warming up respectively), regain their full color and mobility within 15 minutes.

One major factor responsible for generating colors under the conditions of the present invention described above is the maximization of effective amplitude modulation. This arises because the biological molecules and other liquid crystals typically have complicated shapes, and one would expect the presence of many different minor vibrational directions oriented differently from the major directions. Ignoring dispersions, optical activities and other effects, two main mechanisms are involved in generating color as far as the organism is concerned. Firstly, the intrinsic birefringences of the biological molecules, which introduce phase differences that add to or subtract from that due to the wave-plate. Secondly, for the same range of birefringences different vibrational directions in the tissues will make different vectorial contributions to the resultant composition of light passing through the wave-plate and then on to the analyzer. It is the second factor that is crucial in biological and other liquid crystals—as opposed to a uniform mineral crystal with only one or at the most a few polarizing axes—and which is affected by the present invention of aligning one vibrational direction of the wave-plate at a small angle from that of either of the crossed polarizers. In contrast the conventional alignment of the vibrational direction of the wave-plate at 45° with respect to those of the crossed polarizers, the present invention maximizes subtractions and additions of phase differences over all vibrational directions in the molecular arrays of the organism giving increased color contrasts. In addition, for a given intrinsic birefringence, it evens out the absolute intensities of light over all vibrational directions and across all phase differences introduced by the wave-plate within the visible spectrum, so that one effectively "sees" a wider range of birefringences simultaneously; in other words, the technique in accordance with the invention also optimizes overall chromaticity of the organism as a whole.

The methods and techniques of the present invention have many potential applications. As each organ and tissue can be recognised from its specific color, the present invention means that there is no need for vital staining in many developmental studies. This has the obvious advantage that no chemical modification of the tissues is involved. A developing organism can be monitored at intervals without suffering ill effects. The methods of the present invention are minimally invasive. Indeed, image enhancement, together with improved color sensitivity and resolution in the recording facilities, would enable one to reduce the level of light to such an extent that the procedure could be completely non-invasive. With the aid of video recording techniques, an accurate analysis of muscular and other movements can also be made. As mentioned above, an important aspect of the color images is that the specific colors obtained for each tissue reflect the physical and energetic organisation of the constituent macromolecules. This can be used to enable one to recognise coherent changes in protein conformations accompanying functional activities. This technique, suitably adapted for use with fibre optics, can have applications in the clinical diagnosis of organ/tissue malfunction, and in prenatal diagnosis. These are examples only of the many potential applications of interference color vital imaging as embodied in the methods and apparatus of the present invention.

We claim:

1. A method of generating interference colors in an object which is a living organism or a weakly birefringent material using a polarizing microscope, which, comprises placing a compensating wave-plate in series with the object in the light path between crossed polarizers, and aligning one or other of the vibrational directions of the compensating wave-plate at a small angle of horizontal rotation from either of the vibrational directions of the crossed polarizers.

2. A method as claimed in claim 1, in which the wave-plate is aligned with one of its vibrational directions at an angle of horizontal rotation of from 2° to 15° from that of the polarizer.

3. A method as claimed in claim 1, in which the wave-plate is aligned with one of its vibrational directions at an angle of horizontal rotation of from 2° to 15° from that of the analyzer.

4. A method as claimed in claim 2, in which the said angle is from 4° to 7.5°.

5. A method as claimed in claim 3, in which the said angle is from 4° to 7.5°.

6. A method as claimed in claim 1, in which the wave-plate is a birefringent crystal having a thickness sufficient to cause a phase difference of $2\pi$ of green light between the two perpendicularly polarized light rays in the passage of these light rays through the plate.

7. A method as claimed in claim 1, which includes adjusting the vertical distance of a condenser of the microscope relative to the polarizer and the object in order differentially to illuminate the interior or the exterior tissue layers of the organism.

8. Apparatus for generating interference colors in living organisms and weakly birefringent materials, comprising a light source, a polarizer, a sample object, an analyzer, and a compensating wave-plate placed in series with the object in the light path between the crossed polarizers, wherein one or other of the vibrational directions of the compensating wave-plate is aligned at a small angle of horizontal rotation from either of the vibrational directions of the crossed polarizers.

9. Apparatus as claimed in claim 8, in which the wave-plate is aligned with one of its vibrational directions at an angle of from 2° to 15° from the vibrational direction of the polarizer.

10. Apparatus as claimed in claim 8, in which the wave-plate is aligned with one of its vibrational directions at an angle of from 2° to 15° from the vibrational direction of the analyzer.

11. Apparatus as claimed in claim 9, in which the said angle is from 4° to 7.5°.

12. Apparatus as claimed in claim 10, in which the said angle is from 4° to 7.5°.

13. Apparatus as claimed in claim 8, in which the wave-plate is a birefringent crystal having a thickness sufficient to cause a phase difference of $2\pi$ of green light between the two perpendicularly polarized light rays in the passage of these light rays through the plate.

14. Apparatus as claimed in claim 8, which includes a condenser the vertical height of which can be adjusted relative to the polarizer and the object in order differentially to illuminate the interior or exterior tissue layers of the organism.

15. Apparatus as claimed in claim 8, which comprises a photomicroscope.

16. Apparatus as claimed in claim 15, which includes means to store successive photographic frames in a real-time imaging sequence, means to transform the color and intensity of designated areas of an image to a predetermined index of birefringence, and means to compare a sequence of images and determine the changes in the index of birefringence.

17. Apparatus as claimed in claim 15, which includes means to standardise colors and intensities of an image, thereby to create a standard matrix of birefringence.

\* \* \* \* \*